(12) United States Patent
McGuire et al.

(10) Patent No.: US 9,348,807 B2
(45) Date of Patent: May 24, 2016

(54) APPARATUS AND METHOD FOR PROVIDING A CONDITION BUILDER INTERFACE

(75) Inventors: Kevin T. McGuire, Ottawa (CA); Eduardo Jose Pereira, Ottawa (CA); Nashib Qadri, Ottawa (CA); David Douglas Springgay, Ottawa (CA)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 13/008,758

(22) Filed: Jan. 18, 2011

(65) Prior Publication Data

US 2011/0119286 A1    May 19, 2011

Related U.S. Application Data

(63) Continuation of application No. 12/170,603, filed on Jul. 10, 2008, now Pat. No. 7,899,836, which is a continuation of application No. 11/098,820, filed on Apr. 5, 2005, now Pat. No. 7,428,536.

(51) Int. Cl.
*G06F 17/27* (2006.01)
*G06F 17/24* (2006.01)

(52) U.S. Cl.
CPC ............ *G06F 17/276* (2013.01); *G06F 17/246* (2013.01)

(58) Field of Classification Search
CPC .................................................. G06F 17/276
USPC ................... 707/999.003–999.006, 705–784, 707/999.003–999.005
See application file for complete search history.

(56) References Cited

U.S. PATENT DOCUMENTS

| 5,813,019 | A | * | 9/1998 | Van De Vanter | 715/236 |
|---|---|---|---|---|---|
| 6,523,027 | B1 | * | 2/2003 | Underwood | |
| 6,535,883 | B1 | * | 3/2003 | Lee et al. | 707/694 |
| 6,601,233 | B1 | * | 7/2003 | Underwood | 717/102 |
| 6,609,128 | B1 | * | 8/2003 | Underwood | 707/610 |
| 6,610,106 | B1 | * | 8/2003 | Jenks | 715/205 |
| 6,633,878 | B1 | * | 10/2003 | Underwood | |
| 6,704,873 | B1 | * | 3/2004 | Underwood | 726/12 |
| 6,718,535 | B1 | * | 4/2004 | Underwood | 717/101 |
| 7,039,635 | B1 | * | 5/2006 | Morgan et al. | |
| 7,383,513 | B2 | * | 6/2008 | Goldberg et al. | 715/763 |
| 2003/0135453 | A1 | * | 7/2003 | Caulfield et al. | 705/38 |
| 2005/0131888 | A1 | * | 6/2005 | Tafoya et al. | 707/3 |
| 2006/0224959 | A1 | * | 10/2006 | McGuire et al. | 715/700 |

* cited by examiner

*Primary Examiner* — Syling Yen
(74) *Attorney, Agent, or Firm* — Steven M. Greenberg, Esq.; CRGO Law

(57) ABSTRACT

An apparatus and method for providing a user interface through which a user may generate a conditional expression are provided. The user interface provides guidance to a user as to the proper parts of the conditional expression to include in the conditional expression as the user constructs the conditional expression. Thus, as the user completes parts of the conditional expression, the guidance that is offered is updated based on the current context of the conditional expression. This guidance may include listings of variables, attributes and/or functions that are most appropriate to be entered next in the conditional expression, help text, and the like.

15 Claims, 9 Drawing Sheets

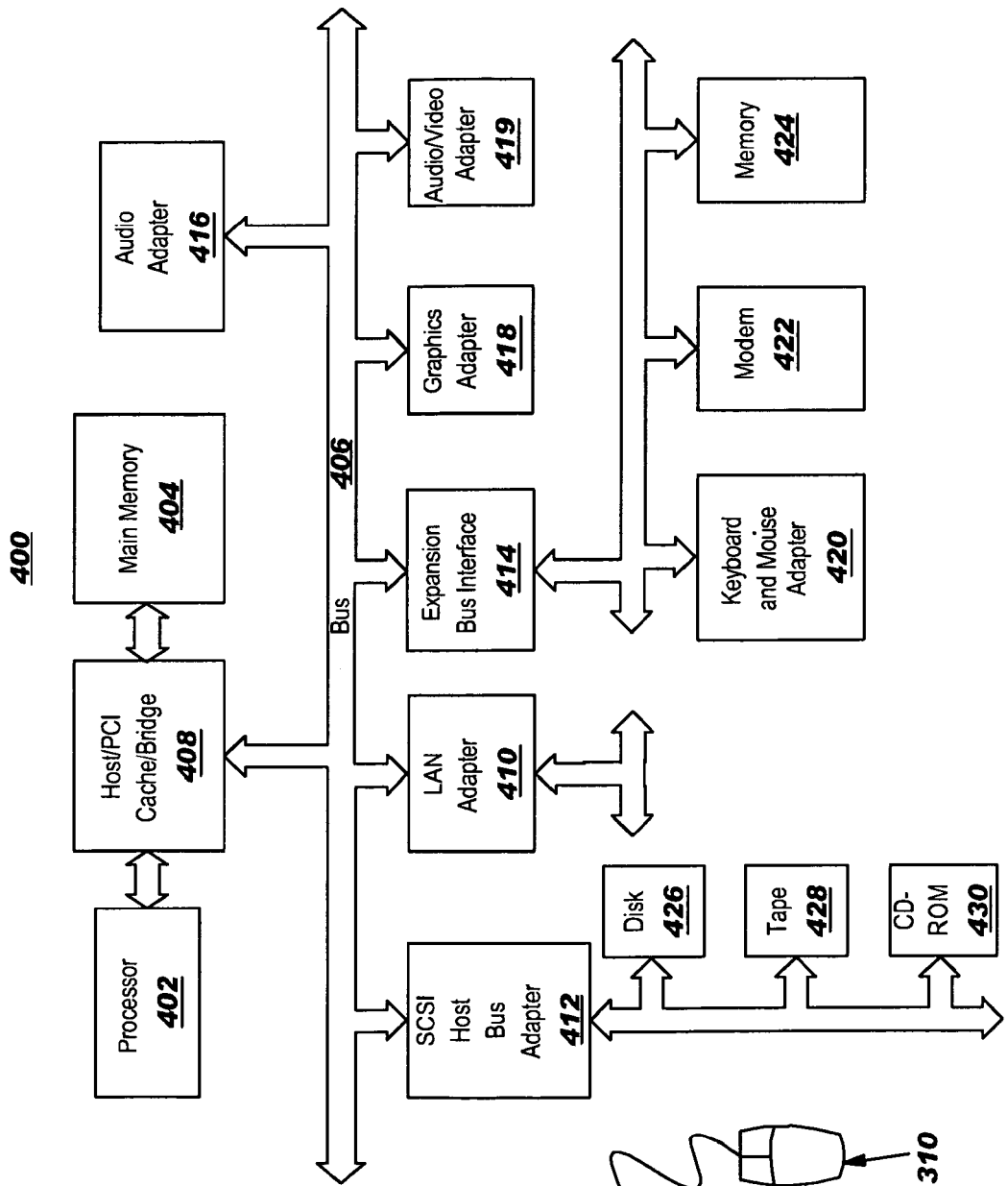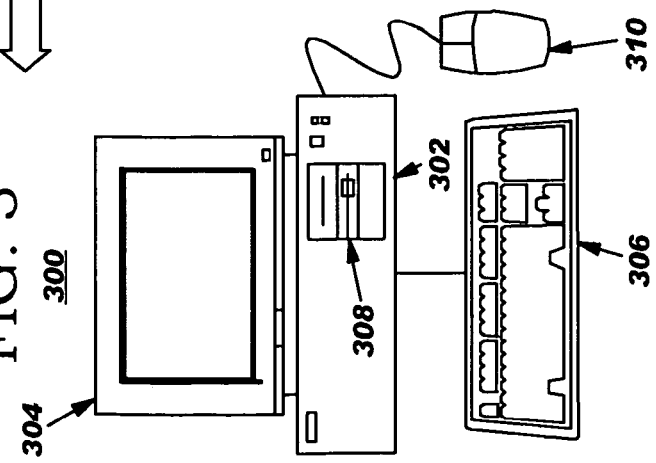

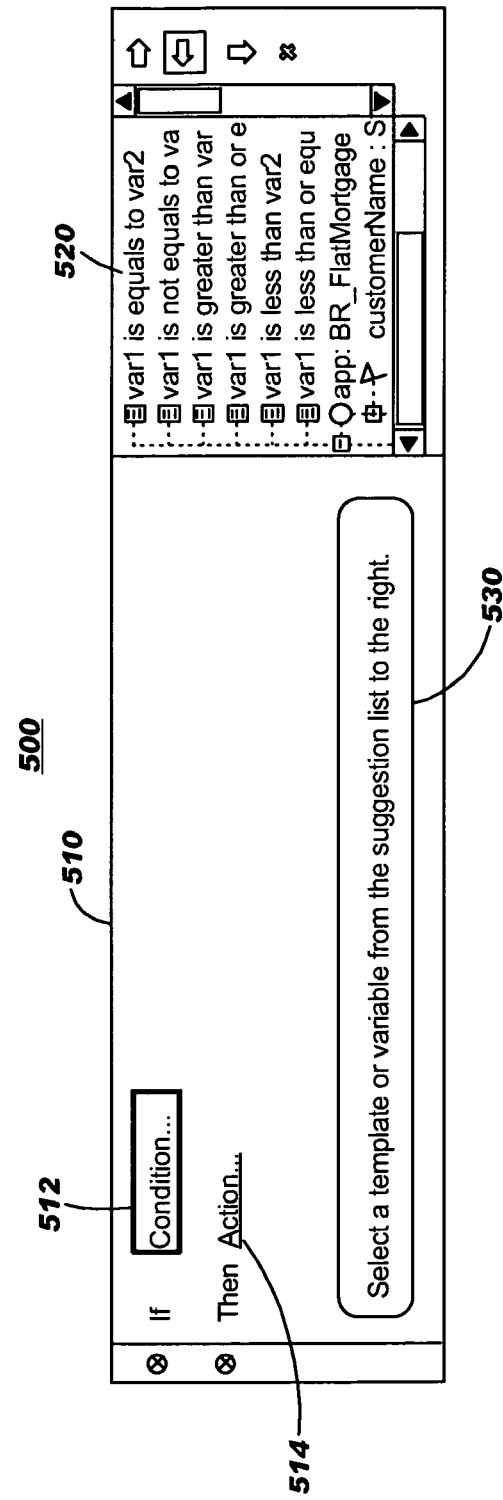

500

APPARATUS AND METHOD FOR PROVIDING A CONDITION BUILDER INTERFACE

CROSS-REFERENCE TO RELATED APPLICATIONS

This application is a Continuation of U.S. application Ser. No. 12/170,603, filed on Jul. 10, 2008, which claims priority to U.S. patent application Ser. No. 11/098,820, filed Apr. 5, 2005, now U.S. Pat. No. 7,428,536, which is incorporated herein by reference in its entirety.

BACKGROUND OF THE INVENTION

1. Technical Field

The present invention is generally directed to an improved data processing system. More specifically, the present invention is directed to an apparatus and method for providing a condition builder interface.

2. Description of Related Art

In many computer applications, there are scenarios where a user has to define a condition expression. For example, in a mortgage approval application, mortgage approval may be granted for a customer if the monthly mortgage payment is less than 33% of their monthly income. These conditional expressions are typically expressed using a computer language which novice users may find difficult to understand and use. To simply the creation of these conditional expressions, a number of different techniques have been developed and adopted by computer application providers.

For example, in Microsoft Excel™, a spreadsheet application available from Microsoft Corporation, a condition is defined using a graphical user interface having a series of combination boxes as illustrated in FIG. 1A. As shown in FIG. 1A, the conditional expression user interface for Microsoft Excel™ includes a first field 110 for entering a parameter upon which the condition operations, a second field 120 for entering the condition type, and at least one third field 130 for entering parameter values for the condition.

Different condition types selected via the second field 120 may result in a different number of parameter value fields 130, as illustrated in FIG. 1B. As shown, rather than two parameter value fields 130 as in the "between" condition type selected in FIG. 1A, the "greater than" condition type selected in field 120 of FIG. 1B results in only a single parameter value field 130 being provided.

If a condition is not within the bounds of a simple expression list, i.e. the condition is not one of those that may be selected from the drop-down menu associated with field 120, then a graphical user interface (GUI) may be provided for entry of a formula identifying the condition, as illustrated in FIG. 1C. As shown in FIG. 1C, the conditional formatting GUI includes a first field 150 for entry of the type of condition and a second field 160 for entry of the formula.

While the Microsoft Excel™ approach to defining conditional expressions makes the creation of very simple conditions easy, it makes the creation of more complex expressions very difficult. This difficulty stems from a number of drawbacks associated with the Microsoft Excel approach. First, the condition language that is to be used in defining conditional expressions is not described in the graphical user interfaces. The user must learn this conditional language by trial and error or going to the documentation accompanying the software application. In addition, the graphical user interfaces do not provide any examples that would provide a user with guidance on how to create the conditional expression they are attempting to create. Moreover, there is no guidance provided by the graphical user interfaces as the user enters their conditional expression guiding the user as to how to complete the conditional expression. Furthermore, no guidance is provided to the user when the user enters a conditional expression that has an error as to how to remedy the error. Furthermore, there is no ability in the Microsoft Excel™ graphical user interfaces for permitting the user to browse the variables or functions which can be referenced in the conditional expression based on the current context of the conditional expression.

In Microsoft Access™, a database application available from Microsoft Corporation, a different graphical user interface style is used to define conditions. As shown in FIG. 2, the graphical user interface is composed of twenty or more virtual buttons. There is a button 210 for every type of operator which can be contained in the conditional expression (shown in field 220), and three list boxes 230-250 which can be used to select from a range of variables, fields and functions.

The Microsoft Access™ approach to defining conditional expressions makes both simple and complex conditions difficult to create. As with the Microsoft Excel™ approach, the Microsoft Access™ approach also does not provide any information regarding the conditional language, that is used to describe a conditional expression, in the graphical user interface. As a result, the user must learn this conditional language by trial and error or consult the documentation accompanying the software application. Again, there are not examples in the graphical user interface to provide assistance to the user in generating their conditional expression. Furthermore, although there is a list of variables and functions that may be selected, there is no guidance with regard to which variables and functions from the lists should be selected. In other words, it is rather easy for a user to generate a conditional expression with errors by selecting the wrong variables and functions from the lists since no guidance is given as to which variables and functions are most appropriate for the current context of the conditional expression.

Thus, it would be beneficial to have an improved apparatus and method for providing an interface through which a user may generate a conditional expression and through which guidance may be provided to the user to aid the user in generating the conditional expression based on the current context of the conditional expression.

BRIEF SUMMARY OF THE INVENTION

The present invention provides an apparatus, method and computer program product for providing a user interface through which a user may generate a conditional expression. This user interface may be implemented in any type of application that uses conditional expressions including database applications, spreadsheet applications, and the like.

The user interface of the present invention provides guidance to a user as to the proper components of the conditional expression to include in the conditional expression as the user constructs the conditional expression. Thus, as the user completes parts of the conditional expression, the guidance that is offered is updated based on the current context of the conditional expression. This guidance may include listings of variables, attributes and/or functions that are most appropriate to be entered next in the conditional expression, help text, and the like.

The interface, in accordance with one embodiment, includes a conditional expression tree component, an entry suggestion list component, and a hint message component. The hint message component provides the user with guidance messages instructing the user as to what actions need to be performed or input needs to be provided with regard to a currently selected or modified part of a condition expression in the conditional expression tree component. The entry suggestion list component provides the user with guidance regarding the particular entries that would be appropriate for inclusion in the conditional expression at a position currently being selected or modified by the user in the conditional expression tree component of the interface. The conditional expression tree component of the interface provides a current context of the conditional expression depicted in a hierarchical tree format.

The hierarchical tree format of the conditional expression tree component is such that conditional expressions that must be satisfied together are connected using a solid line while conditional expressions that may be alternatively satisfied are connected using dotted lines. In addition, the Boolean operators "and," "or," "not", etc. may be depicted in accordance with these connections. The conditional expressions are hierarchically depicted as a primary or parent condition with its sub-conditions being indented beneath it. A user may shift sub-conditions left or right in the conditional expression tree component to either create a sub-condition or collapse sub-conditions.

Thus, the present invention provides a graphical user interface through which a user is provided guidance at every stage of a process for generating a conditional expression. Guidance is offered in the form of an entry suggestion list that is dynamically updated based on the selections and input made by the user and one or more hint messages output to the user via a hint message component of the graphical user interface. In this way, the user is given guidance as to what action they must perform with regard to the selected or currently being modified part of the conditional expression using the dynamically updated hint message. In addition, the user is given guidance as to what entries would be appropriate for the selected or currently being modified part of the conditional expression using the dynamically updated entry suggestion list. The result is a user interface for generation of conditional expressions that is more user friendly, provides greater guidance to users so that less sophisticated users may use it with ease, and eliminates the need for the user to learn on a trial-and-error basis the way in which a conditional expression is to be built.

These and other features and advantages of the present invention will be described in, or will become apparent to those of ordinary skill in the art in view of, the following detailed description of the preferred embodiments.

BRIEF DESCRIPTION OF THE SEVERAL VIEWS OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 3 is an exemplary diagram of a computing device in which aspects of the present invention may be implemented;

FIG. 4 is an exemplary block diagram of the primary operational components of a computing device in which aspects of the present invention may be implemented;

FIG. 5 is an exemplary diagram of an initial graphical user interface for generating a conditional expression in accordance with one exemplary embodiment of the present invention;

DETAILED DESCRIPTION OF THE INVENTION

Figure 1A:
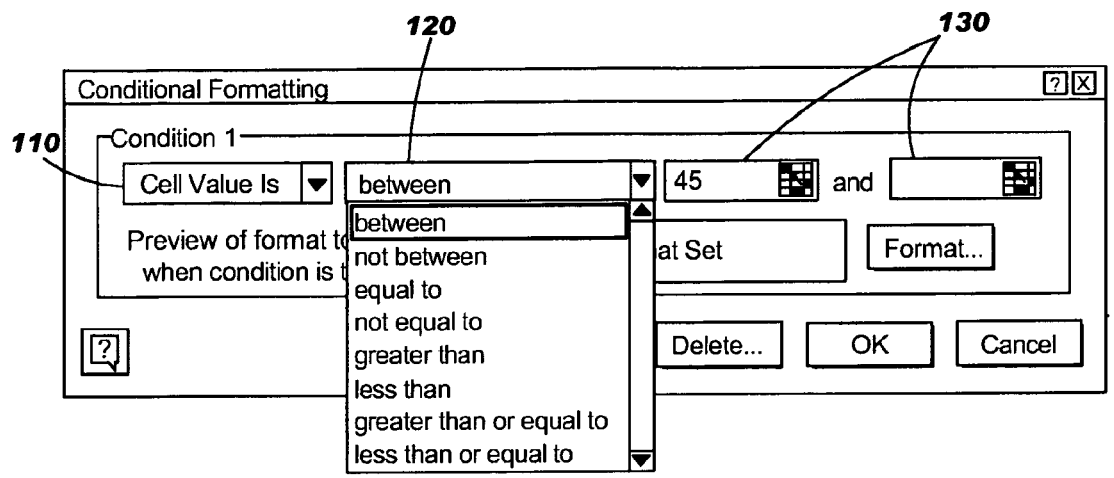
FIG. 1A is an exemplary diagram of a Microsoft Excel™ graphical user interface for entry of a conditional expression in which two parameter value fields are provided.
Figure 1B:
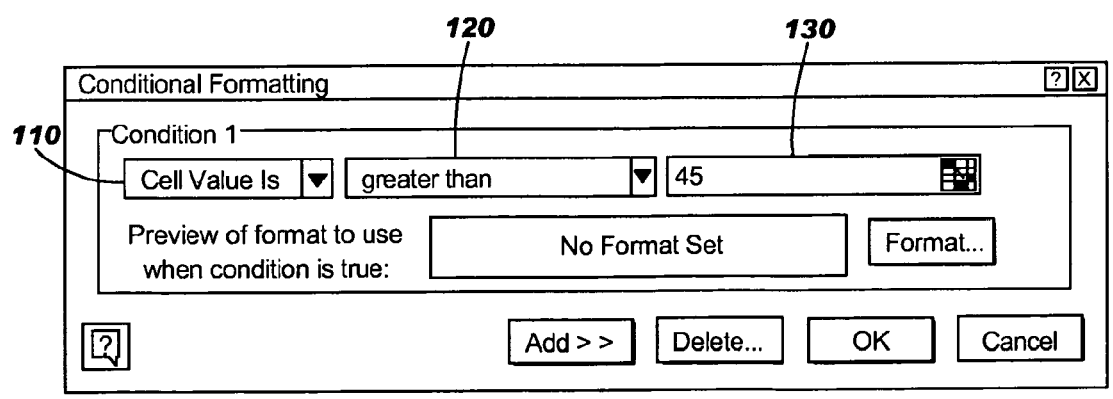
FIG. 1B is an exemplary diagram of a Microsoft Excel™ graphical user interface for entry of a conditional expression in which one parameter value field is provided.
Figure 1C:
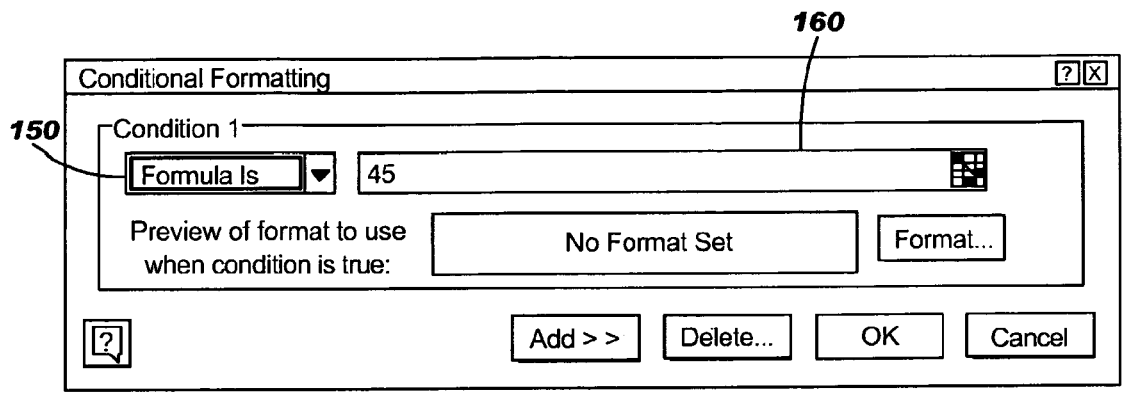
FIG. 1C is an exemplary diagram of a Microsoft Excel™ graphical user interface for entry of a conditional expression in which a formula may be entered.
Figure 2:
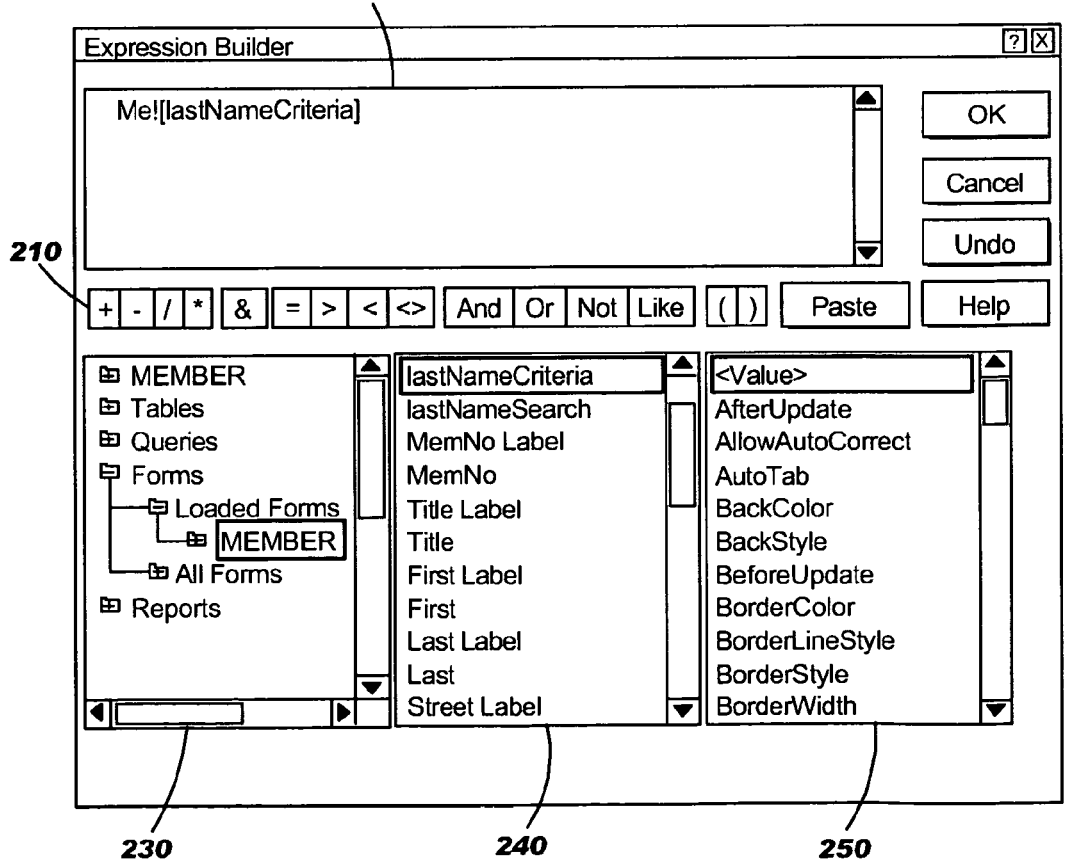
FIG. 2 is an exemplary diagram of a Microsoft Access™ graphical user interface for entry of a conditional expression.

The present invention provides an apparatus, method and computer program product for providing a condition builder interface through which a user may generate conditional expressions. The present invention is preferably implemented in a data processing environment. This data processing environment may be a single computing device or may be a distributed data processing environment incorporating a plurality of computing devices. FIGS. 3 and 4 are provided as an exemplary data processing environment in which aspects of the present invention may be implemented. It should be appreciated that FIGS. 3 and 4 are only exemplary and are not intended to state or imply any limitation as to the type of data processing environments in which the present invention may be implemented.

With reference now to the figures and in particular with reference to FIG. 3, a pictorial representation of a data processing system in which the present invention may be implemented is depicted in accordance with a preferred embodiment of the present invention. A computer 300 is depicted which includes system unit 302, video display terminal 304, keyboard 306, storage devices 308, which may include floppy drives and other types of permanent and removable storage media, and mouse 310. Additional input devices may be included with personal computer 300, such as, for example, a joystick, touchpad, touch screen, trackball, microphone, and the like. Computer 300 can be implemented using any suitable computer, such as an IBM eServer computer or IntelliStation computer, which are products of International Business Machines Corporation, located in Armonk, N.Y. Although the depicted representation shows a computer, other embodiments of the present invention may be implemented in other types of data processing systems, such as a network computer. Computer 300 also preferably includes a graphical user interface (GUI) that may be implemented by means of systems software residing in computer readable media in operation within computer 300.

With reference now to FIG. 4, a block diagram of a data processing system is shown in which the present invention may be implemented. Data processing system 400 is an example of a computer, such as computer 300 in FIG. 3, in which code or instructions implementing the processes of the present invention may be located. Data processing system 400 employs a peripheral component interconnect (PCI) local bus architecture. Although the depicted example employs a PCI bus, other bus architectures such as Accelerated Graphics Port (AGP) and Industry Standard Architecture (ISA) may be used. Processor 402 and main memory 404 are connected to PCI local bus 406 through PCI bridge 408. PCI bridge 408 also may include an integrated memory controller and cache memory for processor 402. Additional connections to PCI local bus 406 may be made through direct component interconnection or through add-in connectors. In the depicted example, local area network (LAN) adapter 410, small computer system interface SCSI host bus adapter 412, and expansion bus interface 414 are connected to PCI local bus 406 by direct component connection. In contrast, audio adapter 416, graphics adapter 418, and audio/video adapter 419 are connected to PCI local bus 406 by add-in boards inserted into expansion slots. Expansion bus interface 414 provides a connection for a keyboard and mouse adapter 420, modem 422, and additional memory 424. SCSI host bus adapter 212 provides a connection for hard disk drive 426, tape drive 428, and CD-ROM drive 430. Typical PCI local bus implementations will support three or four PCI expansion slots or add-in connectors.

An operating system runs on processor 402 and is used to coordinate and provide control of various components within data processing system 400 in FIG. 4. The operating system may be a commercially available operating system such as Windows XP, which is available from Microsoft Corporation. An object oriented programming system such as Java may run in conjunction with the operating system and provides calls to the operating system from Java programs or applications executing on data processing system 400. "Java" is a trademark of Sun Microsystems, Inc. Instructions for the operating system, the object-oriented programming system, and applications or programs are located on storage devices, such as hard disk drive 426, and may be loaded into main memory 404 for execution by processor 402.

Those of ordinary skill in the art will appreciate that the hardware in FIG. 4 may vary depending on the implementation. Other internal hardware or peripheral devices, such as flash read-only memory (ROM), equivalent nonvolatile memory, or optical disk drives and the like, may be used in addition to or in place of the hardware depicted in FIG. 4. Also, the processes of the present invention may be applied to a multiprocessor data processing system.

For example, data processing system 400, if optionally configured as a network computer, may not include SCSI host bus adapter 412, hard disk drive 426, tape drive 428, and CD-ROM 430. In that case, the computer, to be properly called a client computer, includes some type of network communication interface, such as LAN adapter 410, modem 422, or the like. As another example, data processing system 400 may be a stand-alone system configured to be bootable without relying on some type of network communication interface, whether or not data processing system 400 comprises some type of network communication interface. As a further example, data processing system 400 may be a personal digital assistant (PDA), which is configured with ROM and/or flash ROM to provide non-volatile memory for storing operating system files and/or user-generated data.

The depicted example in FIG. 4 and above-described examples are not meant to imply architectural limitations. For example, data processing system 400 also may be a notebook computer or hand held computer in addition to taking the form of a PDA. Data processing system 400 also may be a kiosk or a Web appliance.

The processes of the present invention are performed by processor 402 using computer implemented instructions, which may be located in a memory such as, for example, main memory 404, memory 424, or in one or more peripheral devices 426-430.

As mentioned above, the present invention is directed to an improved apparatus, method and computer program product for providing a condition expression building interface. The condition expression building interface of the present invention leads the user through the creation of the conditional expression. The interface of the present invention provides a first component that is the condition expression tree building component, a second component that is an entry suggestion list from which the user may select an entry suggestion to incorporate into the condition expression tree in the first component, and a third component that is a hint area component which provides comments to assist the user based on the current state of the condition expression tree in the first component. Initially, the user is requested, via the interface, to select a simple expression type, i.e. a condition. These various components of the interface are illustrated in FIG. 5.

FIG. 5 is an exemplary diagram of an initial graphical user interface for generating a conditional expression in accordance with one exemplary embodiment of the present invention. As shown in FIG. 5, the condition expression tree component 510 of the interface 500 includes a conditional part 512, i.e. the "If" part, and an action part 514, i.e. the "Then" part. A user may enter conditions in the conditional part 514 that, when satisfied, result in a user defined action in the action part 514 being performed.

Conditions generated by the user in the condition part 512 of the condition expression tree component 510 are depicted in the condition expression tree component 510 as a condition tree, or tree of conditions. For example, an initial condition may be presented at a first level, or root level, of the condition tree with subsequent conditions appearing as branches off of the initial condition based on their correspondence with the initial condition. More information about the manner in which condition trees are depicted in the conditional expression tree component 510 will be provided hereafter with reference to FIGS. 6A-6D and 7.

To the right of the condition expression tree component 510 is the entry suggestion list component 520 of the interface 500. The entry suggestion list component 520 is a context sensitive list of the possible entries for a selected part of the condition tree currently existing in the condition expression tree component 510. The entry suggestion list component 520 is updated dynamically as different parts of the condition tree present in the condition expression tree component 510 are selected. A user may select an entry suggestion from the entry suggestion list component 520 in order to incorporate that entry suggestion into the selected part of the condition tree in the condition expression tree component 510.

Below the condition expression tree component 510 is the hint component 530 of the interface 500. The hint component 530 provides comments to assist the user in what the user needs to do next to complete a conditional expression using the interface 500. These comments are dynamically updated based on the current state of the conditional tree in the condition expression tree component 510 and are geared toward leading the user through the process of generating a conditional expression using the interface 500.

For example, as shown in FIG. 5, the part of the condition tree, "Condition . . . ", has been selected by the user (denoted by the highlighting of the text). In accordance with this selection, both of the entry suggestion list component 520 and the hint component 530 are dynamically updated to provide the necessary assistance to aid the user in generating a conditional expression. For example, entry suggestion list component 520 is updated to include a list of the possible inputs for the highlighted, or selected, part of the condition tree in the condition expression tree component 512.

Figure 6A:
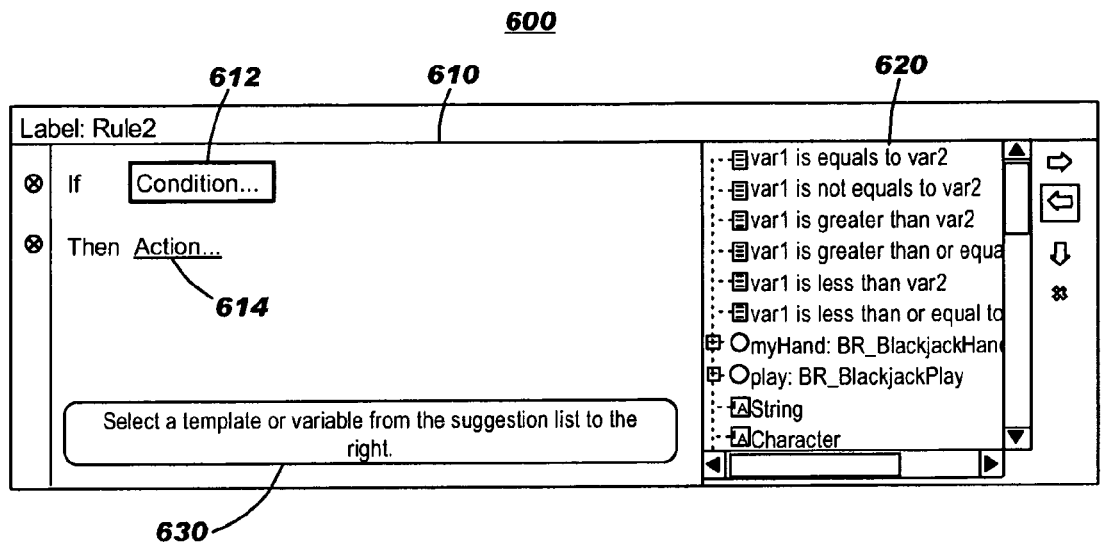
FIGS. 6A-6D are exemplary diagrams illustrating a process for generating a conditional expression in accordance with one exemplary embodiment of the present invention.

FIGS. 6A-6D are exemplary diagrams illustrating a process for generating a conditional expression in accordance with one exemplary embodiment of the present invention. As shown in FIG. 6A, initially, the interface 600 includes a condition expression tree component 610 in which both the condition component 612 and the action component 614 are set to generic text tokens "condition" and "action" so that the user may select these text tokens and be provided with corresponding lists of possible entries for that token in the entry suggestion list component 620. The "condition" and "action" tokens may be represented in the form of a hyperlink, for example. The hyperlink indicates that the "condition" token and "action" token are merely place holders and that the user should select these tokens to define these portions of the conditional expression. If the user selects one of these hyperlink tokens, a corresponding suggestion list is generated to show possible replacements for the place holder, i.e. the suggestion list component 620 is updated with entries for replacement of the selected hyperlink token.

The replacement entries for the selected hyperlink token may themselves include hyperlink tokens that are to be selected by the user for defining the conditional expression. For example, if the suggestion list entry "var1 is equal to var2," is selected to replace the "condition" hyperlink token, the form "Select Variable . . . =Select Variable . . . ," is used to replace the "condition" hyperlink token with the "Select Variable . . . " parts being hyperlink tokens themselves. Once again, the hyperlink tokens are place holders that the user should select in order to complete the conditional expression.

As will be discussed in greater detail hereafter, each time a user selects a token in the condition expression tree component 610, the present invention searches a reference set of data to identify those entries in the reference set of data that have a same type as the selected token. This reference set of data may be dynamically generated by analyzing the data within an application with which the present invention is associated or may be statically present as an established database of entries prior to the use of the present invention to generate a conditional expression.

The matching entries in the reference set of data are then provided in the entry suggestion list component 620 and may be selected by the user in order to modify the currently selected token in the condition expression tree component 610. For example, if the user selects the token "condition" in the condition expression tree component 610, a token type associated with the "condition" token is identified and used to search a condition tree entry reference set of data, having possible condition tree entries stored therein, to identify those entries corresponding to the token type. In the depicted example, the "condition" token has a type that is a "condition expression" type, i.e. a token that identifies the type of conditional expression that is being created. As a result, entries in the condition tree entry reference set of data that represent condition expression types are retrieved. As depicted, these may include, for example, "var1 is equals to var2," "var1 is not equals to var2," "var1 is greater than var2," and the like.

In addition, the selection of a token, such as the "condition" token, in the condition expression tree component 610 of the interface 600 also causes a lookup of hint messages from a hint message reference set of data based on the token type of the selected token. The lookup in the hint message reference set of data attempts to provide hint messages corresponding to the selected token type. Thus, for example, if the user selects the "condition" token in the condition expression tree component 610 of the interface 600, a hint message, such as "Select a template or variable from the suggestion list to the right," corresponding to the token type "condition expression type" is retrieved from the hint message reference set of data and displayed via the hint component 630 of the interface 600. It should be noted that the hint messages may be audibly output in addition to, or in replacement of, the visual display of the hint message in the hint component 630. For example, a prerecorded message or voice synthesis mechanism may be used to audibly output the retrieved hint message so that the user may hear the hint message via his/her speakers or other audio output device.

Figure 6B:
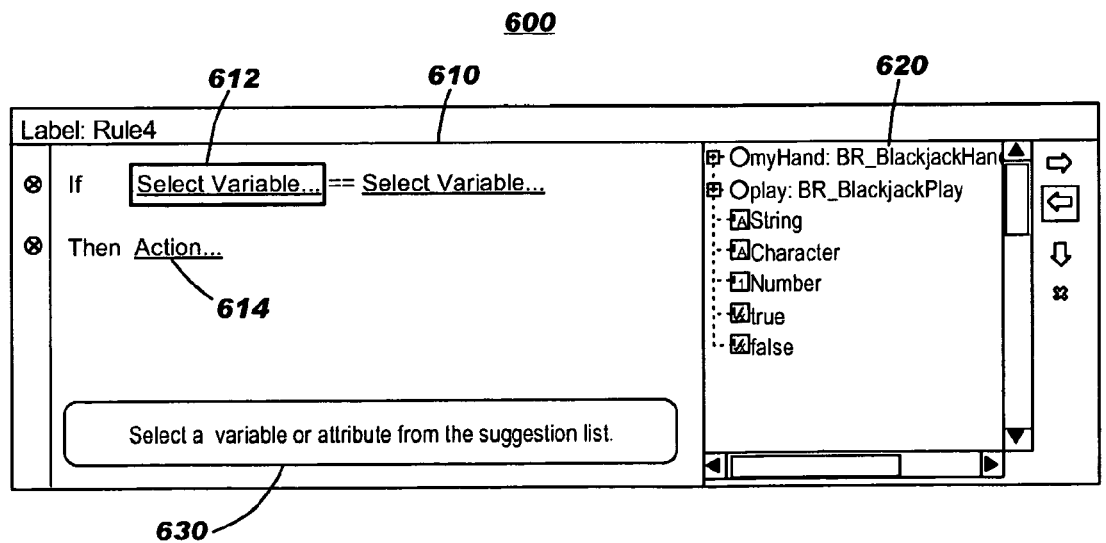

The "condition" token illustrated in FIG. 6A is a token that is used to request that the user select a simple conditional expression type that is to be the basis for generating the conditional expression. Once the user selects a simple conditional expression type that most resembles the type of conditional expression the user wishes to generate, the selected token, i.e. the "condition" token, is replaced with one or more tokens associated with the selected conditional expression. For example, as illustrated in FIG. 6B, the user may select the "var1 is equals to var2" conditional expression type from the entry suggestion list component 620 resulting in the "condition" token being replaced with the series of tokens "Select Variable," "=," and "Select Variable." The order of the tokens and the particular tokens themselves are established as being representative of the selected entry from the entry suggestion list component 620. For example, the series "Select Variable=Select Variable" is equivalent to the selected entry "var1 is equals to var2" from the entry suggestion list component 620.

Thus, as shown in FIG. 6B, the result of selecting the "var1 is equals to var2" entry from the entry suggestion list component 620 is the replacement of the "condition" token with the series of tokens "Select Variable," "=," and "Select Variable." The "Select Variable" token is used to request that the user define the values or variables within the condition expression. When a user selects the "Select Variable" token, there is again a lookup in the condition tree entry reference set of data so that entries having a token type corresponding to the token type of the token "Select Variable" are used to populate an updated version of the entry suggestion list component 620.

In addition to updating the entry suggestion list component 620 in response to the selection of the token "Select Variable," the present invention also updates the hint component 630 by performing a lookup of the token type of the token "Select Variable" in a hint message reference set of data to identify a hint message that has a token type of the same type of the "Select Variable" token. Thus, for example, in response to the user selecting the token "Select Variable" the entry suggestion list component 620 and the hint component 630 are updated. In this way, the user is provided with guidance as to what they need to do with regard to the selected token, e.g., the hint message "Select a variable or attribute from the suggestion list" may be presented. The user is further guided as to the entries that may be used with the selected token in the condition component 612.

Figure 6C:
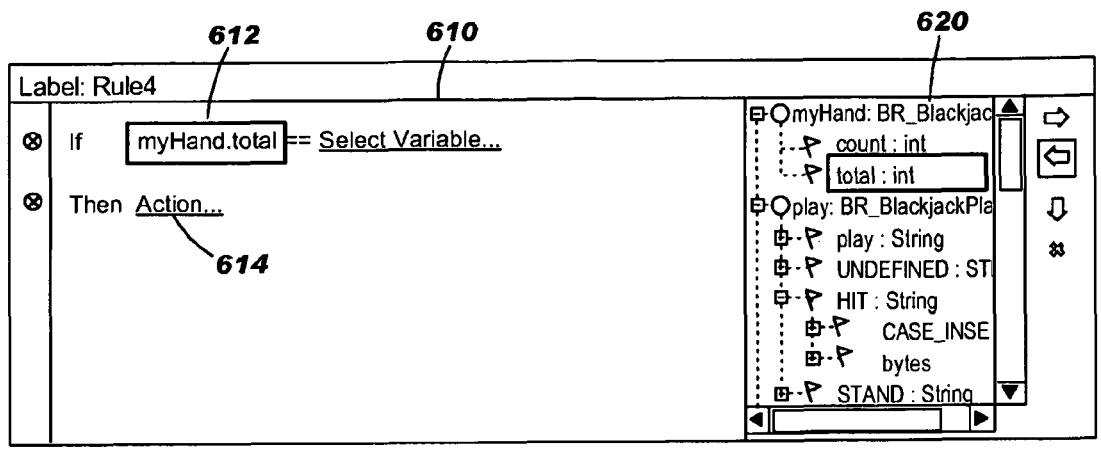

As shown in FIG. 6C, the entry suggestion list component 620 provides a list of possible entries into the part of the condition selected by the user in the condition component 612 of the condition expression tree component 610. The entry suggestion list may take the form of a hierarchical tree in which some variables may be part of variable groups or variables may have selectable attributes that are represented as child nodes of the variable node in the hierarchical tree. For example, as shown in FIG. 6C, the attribute "total:int" is a child node representing an attribute of a variable node "myHand:BR_Blackjack."

Figure 6D:
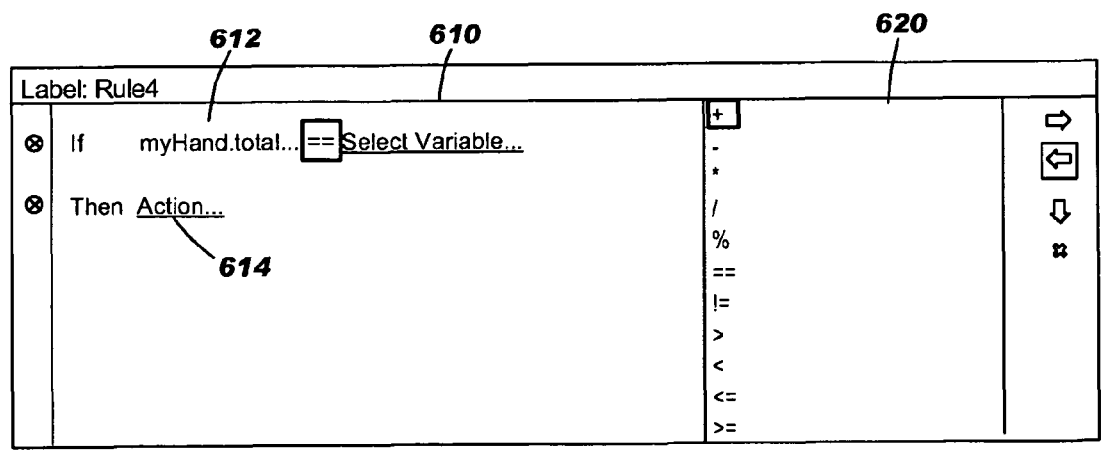

Also shown in FIG. 6C, the token "Select Variable" has been replaced by the variable/attribute "myHand.total" in response to the user selecting the attribute child node "total:int" in the entry suggestion list component 620 of the interface 600. Having selected this variable/attribute, the user may then select the operator token in the condition component 612 as illustrated in FIG. 6D. In response to selecting the operator token in the condition component 612, the entry suggestion list component 620 is updated to include the possible operators that may be used to replace the operator token in the condition component 612.

The particular operators that are used to populate the entry suggestion list component 620 may be determined not only upon the operator token type but also upon the entire context of the condition expression in the condition expression component 612 in its current state. Thus, for example, the operators that are listed in the entry suggestion list component 620 may be specific to the type of operators that may be used with the variable "myHand.total." This may include all of the possible operators matching the operator token type or may be a subset of all of the operators that are specifically determined to be appropriate for the token type of the variable "myHand.total."

In a preferred embodiment, in situations where the selection in the condition tree is not a placeholder, the subset of the condition to the left of the cursor in the condition tree is used to determine the content of the suggestion list. In particular, the content is analyzed according to the grammar of the condition language and every possible completion for that subset to the left of the cursor is enumerated. This yields a set of token types. The set of token types is then used to build a list of variables, functions, methods or operators which have the same type. These will appear in the suggestion list component of the interface.

Thus, as the condition expression is created, the token types of each of the parts of the condition expression that have already been selected prior to the current token are used to identify the entries that should be used to populate the entry suggestion list component 620. In this way, the entry suggestion list component 620 is made to be context sensitive and may have different sets of entries depending on the particular context of the condition expression currently being edited in the condition expression component 612 of the condition expression tree component 610 of the interface 600.

In addition to selecting entries from the entry suggestion list component 620, the present invention permits the user to also manually enter condition entries using a keyboard or other input device. Thus, the entry suggestion list component 620 and the hint component 630 are both provided as aids to the user but do not limit the user as to the manner by which the user may define a condition or the resulting action. This of course permits the user to make mistakes as to the creation of a conditional expression. These mistakes may be identified to the user via the hint component 630 and/or highlighting or otherwise identifying the mistaken part of the condition expression.

Mistakes may be identified by analyzing the input provided by the user in the condition component 612 and verifying that it conforms to the allowable grammar for a conditional expression. This grammar is a reflection of the condition language, which may be Java, C++, or other programming languages. Syntactic and semantic validation is performed to ensure that the condition is well formed. For example, in a condition expression such as "x+5=y," it is verified that the left hand side and the right hand side of the Boolean operation are type compatible.

The process shown in FIGS. 6A-6D may be repeated for each token in the condition component 612 and the action component 614 of the condition expression tree component 610 of the interface 600. In this way, guidance is given at each step of the process of creating a condition expression using the interface 600.

Figure 7:
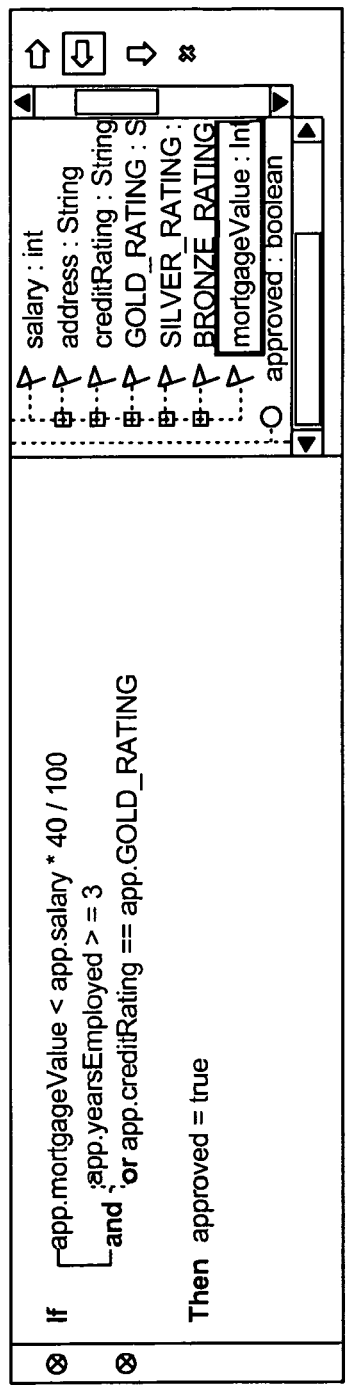
FIG. 7 is an exemplary diagram of a graphical user interface for generating a conditional expression in which a complete conditional expression has been generated.

FIG. 7 is an exemplary diagram of a graphical user interface for generating a conditional expression in which a complete conditional expression has been generated. As shown in FIG. 7, by repeating the process described above with regard to each token in the condition component 612 of the condition expression tree component 610 of the interface 600, a simple or complex conditional expression may be generated. In addition, the process described above may be used to define a simply or complex action by selecting tokens and entries for the action component 614.

As shown in FIG. 7, the conditional expression may be complex and may include a plurality of Boolean expressions in addition to variables, attributes, values and operators. The Boolean expressions, e.g., "and," "or," "not," etc., are illustrated in a tree like fashion. The tree-like notation used in the interface 600 emphasizes the verbal nature of the condition and augments it with graphical lines to clarify the relationship between conditions and sub-conditions.

For example, "and" Boolean expressions are illustrated as being sub-conditions of their parent condition using a dark graphical line connecting the parent condition to the child condition. The Boolean "or" expressions are illustrated as dotted lines linking the two or more alternative conditions and the parent condition. The Boolean expressions "and" and "or" are included in the depicted conditional expression tree and are highlighted, such as through bolding, different color font, background highlighting, etc., to bring the user's attention to these child conditions of the parent condition.

In the depicted example, the parent condition "app.mortgageValue<app.salary*40/100" is denoted condition "A," the child condition "app.yearsEmployed>+3" is denoted condition "B," and the condition "app.creditRating=app.GOLD_RATING" is denoted condition "C." As shown in FIG. 7, mortgage approval is granted, i.e. the action appearing after the "Then" tag is performed, if condition A and either of condition B or condition C are satisfied. There is a grouping between conditions B and C and another grouping between conditions A, B and C. The AND grouping is displayed using a solid line to emphasize that both conditions must be true. The OR grouping is displayed using a dotted line to emphasize that one or the other must be true.

Although the condition expression tree in the condition expression tree component 610 of the interface 600 looks like a tree, the user can interact with the tree as if it were simple text. The user may simply click on a part of the tree and start typing. Alternatively, the user can treat the tree as a bulleted list such that the user may select a single line and shift it to the right to thereby create a new branch of the condition expression tree automatically. For example, if the token "Condition . . . " in FIG. 6A were shifted to the right, the result would as follows:

Before: After:

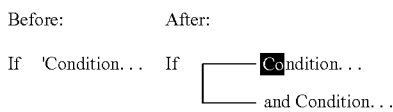

In addition, more than one line of the tree may be selected and shifted to the left, resulting in the collapse of a branch of the condition expression tree. Thus, for example, if the "or" conditions in FIG. 7 were selected and shifted left, the result would be as follows:

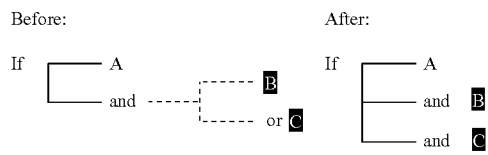

A new sub-condition may be added to an existing condition expression tree by either going to the end of a line in the existing condition expression tree and pressing "Enter" or by entering/selecting a Boolean operator such as "and," "or," etc., manually or from the entry suggestion list component 620. In each case, a new sub-condition is generated below the current line of the condition expression tree.

Figure 8:
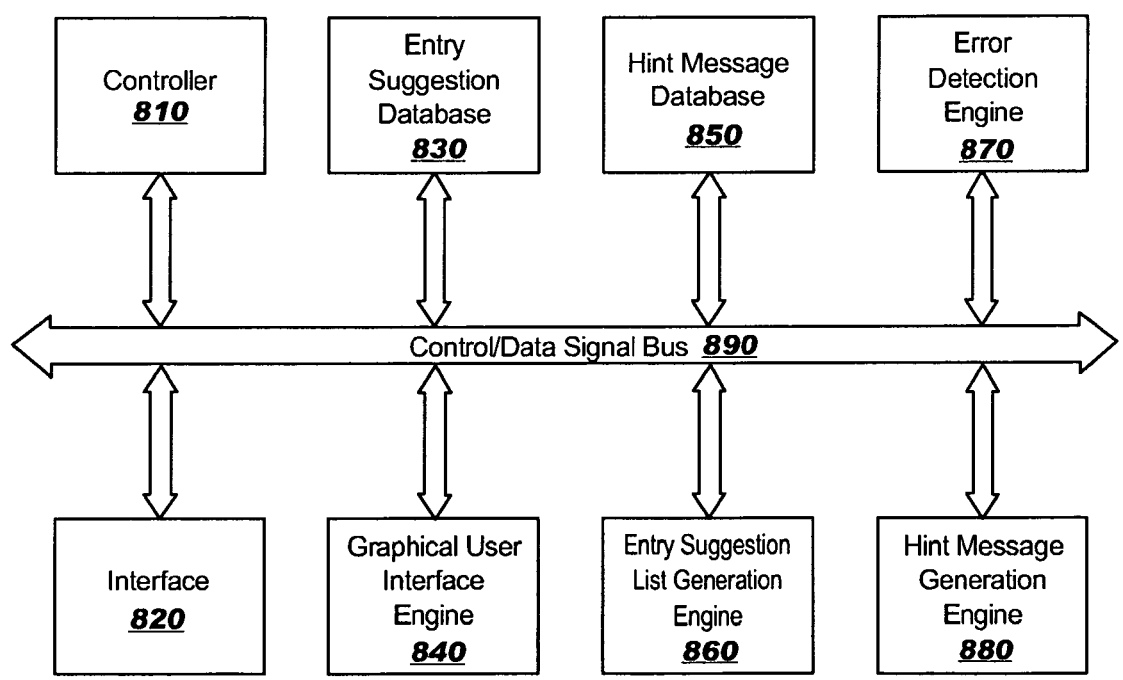
FIG. 8 is an exemplary block diagram illustrating the primary operational components of a conditional expression engine in accordance with the present invention.

FIG. 8 is an exemplary block diagram illustrating the primary operational components of a conditional expression engine in accordance with the present invention. It should be appreciated that the elements shown in FIG. 8 may be implemented in hardware, software or any combination of hardware and software. In a preferred embodiment, the elements in FIG. 8 are implemented as software instructions executed by one or more processing devices on one or more computing devices.

As shown in FIG. 8, the conditional expression engine 800 includes a controller 810, an interface 820, an entry suggestion database 830, a graphical user interface engine 840, a hint message database 850, an entry suggestion list generation engine 860, an error detection engine 870, and a hint message generation engine 880. The elements 810-880 are in communication with one another via the control/data signal bus 890. Although a bus architecture is shown in FIG. 8, the present invention is not limited to such and any architecture that facilitates the communication of control/data signals between the elements 810-880 may be used without departing from the spirit and scope of the present invention.

While the depicted example embodiment of the present invention will be described in terms of "databases" it should be appreciated that the present invention is not limited to such. Rather, the present invention operates on reference sets of data that are indicative of the possible condition entries and hint messages that may be used to generate a conditional expression. These reference sets of data may be generated, for example, dynamically by analyzing the data within an application with which the conditional expression engine 800 is associated, using analyzing code and computer memory, to thereby build reference sets of data in computer memory when needed. Thus, the databases in FIG. 8 are only meant to be illustrative of the reference sets of data that may be used to perform dynamic modification of the entry suggestion list and hint message components of the interface of the present invention. These reference sets may be generated dynamically or may be established as a database prior to use of the interface of the present invention to generate a conditional expression.

The controller 810 controls the overall operation of the conditional expression engine 800 and orchestrates the operation of the other elements 820-880. The interface 820 provides a communication interface through which the conditional expression engine 800 may output generated graphical user interfaces to be presented to the user and receive input from the user.

In response to receiving a user input via the interface 820 indicating that the user wishes to generate a conditional expression, the controller 810 instructs the graphical user interface engine 840 to generate an initial conditional expression tree interface for use by the user. The generation of the initial conditional expression tree interface may include using the entry suggestion list generation engine 860 and the hint message generation engine 880 to generate an entry suggestion list and hint message corresponding to the initial conditional expression tree interface. This initial conditional expression tree interface may take the form of FIG. 6A, for example.

The controller 810 then monitors for further user input indicating selections or input to the initial conditional expression tree interface. In response to receiving a user input or selection, the controller 810 determines the token in the initial conditional expression tree interface that is being modified or selected. An identifier of the token and the taken type are provided to the entry suggestion list generation engine 860 and the hint message generation engine 880. The entry suggestion list generation engine 860 looks up the token type in the entry suggestion database 830 and identifies those entries, and any child entries of these entries, in the database 830 that have the same token type. These entries are compiled into a list. The list of entries, and their child entries, that match the token type of the token being modified or selected is then provided to the graphical user interface engine 840 for updating an entry suggestion list in the initial conditional expression tree interface. Similarly, the hint message generation engine 880 performs a lookup in the hint message database 850 based on the token type to identify a hint message corresponding to the token type.

The hint message generation engine 880 and the entry suggestion list generation engine 860 may maintain a listing of the token types of entries already selected for inclusion in the conditional expression so that a cumulative list is developed. This cumulative list may be used to modify, based on established rules, the displayed entry suggestion list and the hint message used in the conditional expression tree so that they are particular to the cumulative context of the conditional expression. Thus, if the user has selected or input a variable X, and a value Y, then when the user selects an operator token and wishes to obtain an entry suggestion list and hint message for the selected operator token, the entry suggestion list and hint message may be a particular entry suggestion list and hint message for an operator token type between a variable having the attributes of variable X and a value having the attributes of the value Y.

The error detection engine 870 constantly monitors the creation process of the conditional expression to determine if the inputs and selections made by the user result in a problem with the conditional grammar of the conditional expression being generated. As mentioned previously, one way in which such grammatical errors may be determined is to match a format of a selected part of the conditional expression or an inputted part of the conditional expression against the entry suggestion list for the token that was modified in that part of the conditional expression to determine if the format matches any of the suggested entries. If not, an error may be determined to exist.

If there is a detected problem the error detection engine 870 identifies the error and instructs the graphical user interface engine 840 to update the graphical user interface to accentuate the position of the error. This may involve highlighting the part of the conditional expression where the error has been found, outputting a message, such as via the hint message component of the interface, indicating the error, audibly presenting an error message or sound, or the like.

The above operations by the various elements 810-880 are performed repeatedly until the conditional expression is completed. The above operations may further be performed each time a new conditional expression is to be generated by the user. The conditional expression tree interface engine may further be integrated into an application, may be used to aid in generating program code, or the like.

Figure 9:
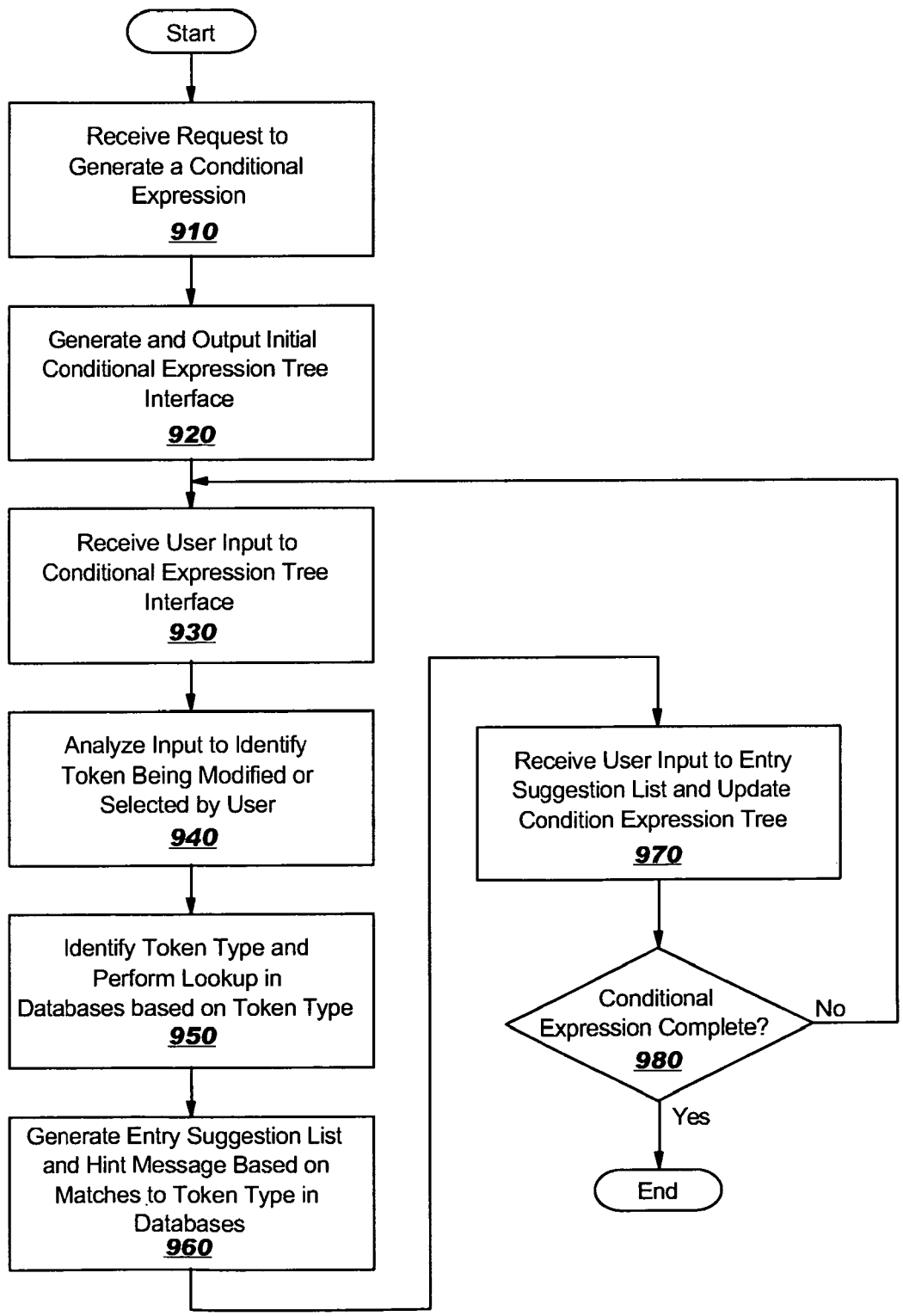
FIG. 9 is a flowchart outlining an exemplary operation of the present invention when generating a conditional expression.

FIG. 9 is a flowchart outlining an exemplary operation of the present invention when generating a conditional expression. It will be understood that each block of the flowchart illustration, and combinations of blocks in the flowchart illustration, can be implemented by computer program instructions. These computer program instructions may be provided to a processor or other programmable data processing apparatus to produce a machine, such that the instructions which execute on the processor or other programmable data processing apparatus create means for implementing the functions specified in the flowchart block or blocks. These computer program instructions may also be stored in a computer-readable memory or storage medium that can direct a processor or other programmable data processing apparatus to function in a particular manner, such that the instructions stored in the computer-readable memory or storage medium produce an article of manufacture including instruction means which implement the functions specified in the flowchart block or blocks.

Accordingly, blocks of the flowchart illustration support combinations of means for performing the specified functions, combinations of steps for performing the specified functions and program instruction means for performing the specified functions. It will also be understood that each block of the flowchart illustration, and combinations of blocks in the flowchart illustration, can be implemented by special purpose hardware-based computer systems which perform the specified functions or steps, or by combinations of special purpose hardware and computer instructions.

It should be noted that there are other functions performed using the conditional expression tree interface of the present invention including insertion of Boolean operators, modifying the tree notation of the conditional component of the condition expression tree interface based on shifting of the lines left or right, and the like, that are not included in the flowchart shown in FIG. 9. FIG. 9 is intended to illustrate a process of updating the entry suggestion list and hint message components of the interface. The other functions that may be performed by the conditional expression tree interface have been described above and may be performed in parallel with the operations depicted in FIG. 9.

As shown in FIG. 9, the operation starts by receiving a request to generate a conditional expression (step 910). In response, an initial conditional expression tree interface is generated and output (step 920). User input to the conditional expression tree interface is received (step 930) and the input is analyzed to identify the token being modified or selected by the user input (step 940). A token type of the identified token is then used to perform a lookup of entries in an entry suggestion list database and a hint message database (step 950). The results of the lookup in the entry suggestion list database is a list of suggested entries for the selected or modified token and the result of the lookup in the hint message database is a hint message for guiding the user in modifying the selected token or token that is being modified (step 960).

User input to the entry suggestion list is then received, e.g., a selection of an element from the entry suggestion list is received, and the condition expression tree is updated (step 970). Thereafter, a determination is made as to whether the conditional expression has been completed (step 980). If not, the operation returns to step 930 and the operations are repeated. If the conditional expression has been completed, the operation terminates.

Thus, the present invention provides a graphical user interface through which a user is provided guidance at every stage of a process for generating a conditional expression. Guidance is offered in the form of an entry suggestion list that is dynamically updated based on the selections and input made by the user and one or more hint messages output to the user via a hint component of the graphical user interface. In this way, the user is given guidance as to what action they must perform with regard to the selected or currently being modified part of the conditional expression using the dynamically updated hint message. In addition, the user is given guidance as to what entries would be appropriate for the selected or currently being modified part of the conditional expression using the dynamically updated entry suggestion list. The result is a user interface for generation of conditional expressions that is more user friendly, provides greater guidance to users so that less sophisticated users may use it with ease, and eliminates the need for the user to learn on a trial-and-error basis the way in which a conditional expression is to be built.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disk, a hard disk drive, a RAM, CD-ROMs, DVD-ROMs, and transmission-type media, such as digital and analog communications links, wired or wireless communications links using transmission forms, such as, for example, radio frequency and light wave transmissions. The computer readable media may take the form of coded formats that are decoded for actual use in a particular data processing system.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method, in a data processing system, for providing an interface for generating a conditional expression for use with a computer application, comprising:

generating an initial user interface having a conditional expression component including one or more tokens and an entry suggestion list component comprising a selection of different entries of programmatic expressions to be selectably used in substitute for corresponding ones of the tokens;

receiving user selection of one of the tokens from a user; and, responsive to the user selection of the one of the tokens:

dynamically updating a hint message component to include a message identifying an action to be performed or an input to be provided by the user in association with the selected token;

dynamically updating the entry suggestion list component to include a list of suggested selectable entries for the token selected by the user by generating a reference set of data identifying possible entries for a conditional expression, determining a token type for a selected token in the one or more tokens for the conditional expression, matching the token type to data types for entries in the reference set of data, and generating a listing of entries from the reference set of data which have data types that match the token type;

receiving a selection by the user of an entry in the list of suggested selectable entries; and replacing the token with the selected entry.

2. The method of claim 1, wherein the one or more tokens for the conditional expression includes at least one hyperlink token that is selectable by a user, and wherein if the hyperlink token is selected by the user, the entry suggestion list is updated to include entries for replacement of the selected hyperlink token.

3. The method of claim 1, wherein the entry suggestion list of the initial user interface includes a listing of templates for conditional expressions.

4. The method of claim 3, wherein at least one template in the listing of templates includes one or more hyperlink tokens selectable by a user, and wherein if a hyperlink token in the at least one template is selected by a user, the entry suggestion list is updated to include entries for replacing the selected hyperlink token.

5. The method of claim 1, wherein the conditional expression component includes a representation of the conditional expression in a hierarchical tree format.

6. The method of claim 5, wherein the hierarchical tree format includes conditional expressions that must both be satisfied being depicted as connected by solid lines.

7. The method of claim 5, wherein the hierarchical tree format includes conditional expressions that may alternatively be satisfied being depicted as connected by dotted lines.

8. A computer program product comprising a non-transitory computer readable storage medium having stored thereon computer readable program code, which when executed by a computer, causes the computer to perform a method for providing an interface for generating a conditional expression for use with a computer application comprising:

generating an initial user interface having a conditional expression component including one or more tokens and an entry suggestion list component comprising a selection of different entries of programmatic expressions to be selectably used in substitute for corresponding ones of the tokens;

receiving user selection of one of the tokens from a user; and, responsive to the user selection of the one of the tokens:

dynamically updating a hint message component to include a message identifying an action to be performed or an input to be provided by the user in association with the selected token;

dynamically updating the entry suggestion list component to include a list of suggested selectable entries for the token selected by the user by generating a reference set of data identifying possible entries for a conditional expression, determining a token type for a selected token in the one or more tokens for the conditional expression, matching the token type to data types for entries in the reference set of data, and generating a listing of entries from the reference set of data which have data types that match the token type;

receiving a selection by the user of an entry in the list of suggested selectable entries; and replacing the token with the selected entry.

9. The computer program product of claim 8, wherein the one or more tokens for the conditional expression includes at least one hyperlink token that is selectable by a user, and wherein if the hyperlink token is selected by the user, the entry suggestion list is updated to include entries for replacement of the selected hyperlink token.

10. The computer program product of claim 8, wherein the entry suggestion list of the initial user interface includes a listing of templates for conditional expressions.

11. The computer program product of claim 10, wherein at least one template in the listing of templates includes one or more hyperlink tokens selectable by a user, and wherein if a hyperlink token in the at least one template is selected by a user, the entry suggestion list is updated to include entries for replacing the selected hyperlink token.

12. The computer program product of claim 8, wherein the conditional expression component includes a representation of the conditional expression in a hierarchical tree format.

13. The computer program product of claim 12, wherein the hierarchical tree format includes conditional expressions that must both be satisfied being depicted as connected by solid lines.

14. The computer program product of claim 12, wherein the hierarchical tree format includes conditional expressions that may alternatively be satisfied being depicted as connected by dotted lines.

15. An apparatus for providing an interface for generating a conditional expression for use with a computer application, comprising:

a processor configured for:

generating an initial user interface having a conditional expression component including one or more tokens and an entry suggestion list component comprising a selection of different entries of programmatic expressions to be selectably used in substitute for corresponding ones of the tokens;

receiving user selection of one of the tokens from a user; and, responsive to the user selection of the one of the tokens:

dynamically updating a hint message component to include a message identifying an action to be performed or an input to be provided by the user in association with the selected token;

dynamically updating the entry suggestion list component to include a list of suggested selectable entries for the token selected by the user by generating a reference set of data identifying possible entries for a conditional expression, determining a token type for a selected token in the one or more tokens for the conditional expression, matching the token type to data types for entries in the reference set of data, and generating a listing of entries from the reference set of data which have data types that match the token type;

receiving a selection by the user of an entry in the list of suggested selectable entries; and replacing the token with the selected entry.

* * * * *